J. I. HOLCOMB.
CORN POPPING MACHINE.
APPLICATION FILED OCT. 13, 1913.
1,192,634.
Patented July 25, 1916.
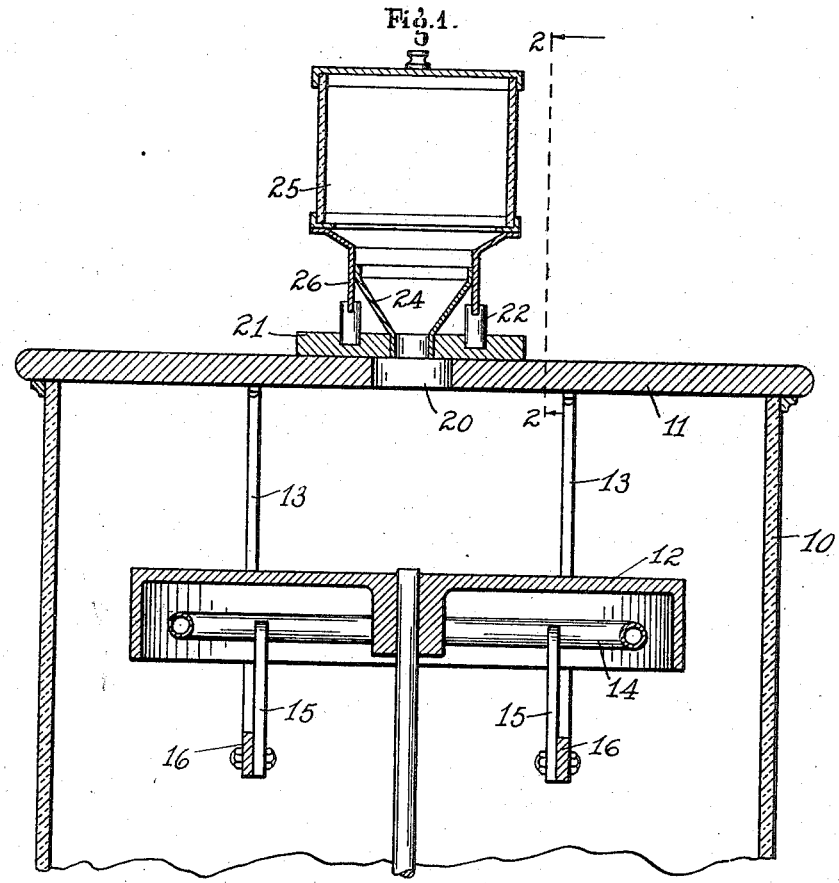
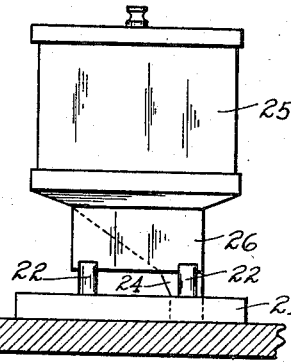
WITNESSES:
O. H. Edgerton.
O. M. McLaughlin
INVENTOR.
James I. Holcomb
BY
ATTORNEY.

UNITED STATES PATENT OFFICE.

JAMES I. HOLCOMB, OF INDIANAPOLIS, INDIANA.

CORN-POPPING MACHINE.

1,192,634.  Specification of Letters Patent. Patented July 25, 1916.

Application filed October 13, 1913. Serial No. 794,865.

*To all whom it may concern:*

Be it known that I, JAMES I. HOLCOMB, a citizen of the United States, and a resident of Indianapolis, county of Marion, and State of Indiana, have invented a certain new and useful Corn-Popping Machine; and I do hereby declare that the following is a full, clear, and exact description thereof, reference being had to the accompanying drawings, in which like letters refer to like parts.

The object of this invention is to improve the construction of corn popping machines and particularly providing means for protecting the corn in the hopper from the heat of the heating means within the machine so that the corn will not be injured or effected by such heat before it reaches the hot plate or popping condition.

It has been found that popcorn will pop much more satisfactorily and quickly if it has not been heated before the popping process is to take place. If, in popcorn machines, the corn is permitted to be heated for a considerable length of time or if the heat thereof increases very slowly, it will tend to make the corn more difficult to pop and practically prevent it from popping into large grains. To get large flaky grains it is important that the heat be applied quickly to the popcorn.

The full nature of the invention will be understood from the accompanying drawings and the following description and claims.

In the drawings, Figure 1 is a vertical section through a portion of a corn popping machine, many parts thereof being omitted. Fig. 2 is a side elevation of the hopper and a section through a part of the corn popping machine on the line 2—2 of Fig. 1.

There is shown herein the casing of a corn popping machine having sides 10 and top 11 and within the same there is suspended a hot plate or popping plate 12 by means of rods 13 and a gas burner 14 is mounted below the hot plate and supported by posts 15 from a cross bar 16. So far as this invention is concerned, it is not very material how the heating means or popping means are constructed.

Upon the portion of the top 11 of the corn popping machine which contains the opening 20 through which the corn enters, there is a board 21 secured and a pair of wooden posts 22 extend up from said board on each side of a funnel 24 of the corn hopper 25 and on each side of the funnel there are supporting plates 26 which are secured to the hopper and are also secured on said posts 22. The neck of the funnel 25 registers with the inlet opening 20 through the top of the corn popping machine.

With this construction the hopper is elevated above the top of the corn popping machine and out of the range of the influence of the heat thereof and it is mounted on the board 21 and the posts 22 made of wood or other poor conductor of heat so that the corn in the hopper 25 will not become heated before it is discharged on the hot plate 12. This is important in machines of this type which are operated constantly and, therefore, are constantly subject to heat. With this construction the corn in the hopper will be kept cool so that the influence of the heat when the corn drops on the hot plate will be great and sudden and, therefore, cause correspondingly greater expansion in the corn when it pops, and thus make large and flaky popcorn.

The invention is:

A corn popping machine including a casing adapted to contain heating means, a board mounted on the top of said casing, posts projecting upward therefrom, said board and posts being made of material which is a non-conductor of heat, a hopper, and a downwardly extending plate on each side of the hopper mounted in and supported by said posts.

In witness whereof, I have hereunto affixed my signature in the presence of the witnesses herein named.

JAMES I. HOLCOMB.

Witnesses:
O. M. McLAUGHLIN,
J. H. WELLS.

Copies of this patent may be obtained for five cents each, by addressing the "Commissioner of Patents, Washington, D. C."